(12) United States Patent
Hattori et al.

(10) Patent No.: US 10,008,895 B2
(45) Date of Patent: Jun. 26, 2018

(54) INVERTER-INTEGRATED ELECTRIC COMPRESSOR

(71) Applicant: MITSUBISHI HEAVY INDUSTRIES AUTOMOTIVE THERMAL SYSTEMS CO., LTD., Kiyosu-shi, Aichi (JP)

(72) Inventors: Makoto Hattori, Aichi (JP); Takuma Yamashita, Tokyo (JP)

(73) Assignee: MITSUBISHI HEAVY INDUSTRIES AUTOMOTIVE THERMAL SYSTEMS CO., LTD., Kiyosu-Shi (JP)

( * ) Notice: Subject to any disclaimer, the term of this patent is extended or adjusted under 35 U.S.C. 154(b) by 294 days.

(21) Appl. No.: 14/768,111

(22) PCT Filed: Mar. 28, 2014

(86) PCT No.: PCT/JP2014/059332
§ 371 (c)(1),
(2) Date: Aug. 14, 2015

(87) PCT Pub. No.: WO2014/174996
PCT Pub. Date: Oct. 30, 2014

(65) Prior Publication Data
US 2016/0020657 A1 Jan. 21, 2016

(30) Foreign Application Priority Data

Apr. 26, 2013 (JP) .................................. 2013-094275

(51) Int. Cl.
*H02K 3/28* (2006.01)
*H02K 3/50* (2006.01)
(Continued)

(52) U.S. Cl.
CPC ............... *H02K 3/28* (2013.01); *F04B 35/04* (2013.01); *F04B 39/121* (2013.01); *F04B 39/14* (2013.01);
(Continued)

(58) Field of Classification Search
CPC . H02K 3/28; H02K 11/33; H02K 3/50; H02K 5/225; F04B 35/04; F04B 39/121;
(Continued)

(56) References Cited

U.S. PATENT DOCUMENTS

| 6,914,357 | B2 * | 7/2005 | Tabatowski-Bush .. H02K 3/522 |
| | | | 174/16.2 |
| 7,268,300 | B2 * | 9/2007 | Miyazaki ......... H01R 13/62905 |
| | | | 174/138 F |

(Continued)

FOREIGN PATENT DOCUMENTS

| CN | 101896724 A | 11/2010 |
| EP | 2 214 294 A1 | 8/2010 |

(Continued)

OTHER PUBLICATIONS

Office Action dated Aug. 2, 2016 in Chinese Application No. 201480009694.3 with an English Translation.
(Continued)

*Primary Examiner* — Forrest M Phillips
(74) *Attorney, Agent, or Firm* — Birch, Stewart, Kolasch & Birch, LLP (57) ABSTRACT

The inverter-integrated electric compressor integrally incorporates an inverter device, and comprises a UVW busbar that conducts three-phase alternating current power converted by an inverter circuit on a circuit board to a glass terminal that penetrates an inverter housing section. The UVW busbar being configured of three long thin plate-shaped conductive material busbars, one end of each being (Continued)

provided with a connector terminal that is connected to the glass terminal, are the three conductive material busbars being housed in and integrated with a resin case. A section of each of the conductive material busbars in at least one location in the length direction thereof is adhered and fixed to the resin case side, using adhesive.

5 Claims, 6 Drawing Sheets

(51) Int. Cl.
      *H02K 5/22*       (2006.01)
      *H02M 7/00*       (2006.01)
      *F04B 35/04*       (2006.01)
      *F04B 39/12*       (2006.01)
      *F04B 39/14*       (2006.01)
      *H02K 11/33*       (2016.01)
      *F04C 23/00*       (2006.01)

(52) U.S. Cl.
    CPC ............ *F04C 23/008* (2013.01); *H02K 3/50* (2013.01); *H02K 5/225* (2013.01); *H02K 11/33* (2016.01); *H02M 7/003* (2013.01); *F04C 2240/803* (2013.01); *F04C 2240/808* (2013.01)

(58) Field of Classification Search
    CPC .. F04B 39/14; F04C 23/008; F04C 2240/803; H02M 7/003; F02C 2240/808
    USPC .......................................................... 310/71
    See application file for complete search history.

(56) References Cited

U.S. PATENT DOCUMENTS

| | | | |
|---|---|---|---|
| 8,154,380 B2 * | 4/2012 | Miller | ................. B60L 11/1811 |
| | | | 324/718 |
| 8,742,709 B2 * | 6/2014 | Watanabe | ........... F04B 39/0027 |
| | | | 310/71 |
| 2010/0170294 A1 | 7/2010 | Nakagami et al. | |
| 2010/0181850 A1 | 7/2010 | Ichise et al. | |
| 2011/0095659 A1 | 4/2011 | Hattori et al. | |
| 2013/0279114 A1* | 10/2013 | Nishikimi | ................ B60K 6/28 |
| | | | 361/699 |

FOREIGN PATENT DOCUMENTS

| | | | | |
|---|---|---|---|---|
| EP | 2 357 361 A1 | | 8/2011 | |
| JP | 2009-207310 A | | 9/2009 | |
| JP | 2010-133366 A | | 6/2010 | |
| JP | 4898931 B2 | * | 3/2012 | ............ F04B 39/121 |
| JP | 2013-41706 A | | 2/2013 | |
| JP | 4898931 B2 | | 2/2013 | |
| WO | WO 2009/066569 A1 | | 5/2009 | |

OTHER PUBLICATIONS

Notice of Granting a Patent Right dated Dec. 28, 2016 for corresponding Chinese Patent Application No. 201480009694.3 with an English Translation.
Japanese Decision to Grant a Patent, dated May 10, 2016, for Japanese Application No. 2013-094275.

* cited by examiner

INVERTER-INTEGRATED ELECTRIC COMPRESSOR

TECHNICAL FIELD

The present invention relates to an inverter-integrated electric compressor in which an inverter device is integrally incorporated into the housing of an electric compressor.

BACKGROUND ART

Inverter-integrated electric compressors, which integrally incorporate inverter devices, are used as air conditioner compressors installed in electric vehicles, hybrid vehicles, and the like. This inverter-integrated electric compressor is configured so that high voltage direct current power supplied from a power supply unit installed in a vehicle is converted to three-phase alternating current power of a required frequency, which is then applied to the electric motor so that the electric motor is driven.

The inverter device is provided with a coil that forms a filter circuit, a plurality of high-voltage electrical components, such as a capacitor, a plurality of semiconductor switching elements, such as IGBTs, that form a switching circuit which converts electricity, an inverter circuit board on which inverter circuits, including the filter circuit and the switching circuit, and control circuits thereof are mounted, a circuit board on which a communication circuit is mounted into which control signals from a host control device (ECU) are input, and the like. The inverter device is configured to convert direct current power that is input from a power supply unit to a P-N terminal via the power source cable to three-phase alternating current power and to output the three-phase alternating current power via a UVW busbar, etc.

The inverter device is normally integrated with an electric compressor by being incorporated into an inverter housing section provided on the outer circumference of the housing of the electric compressor. The inverter device is configured to apply the three-phase alternating current power output via the UVW busbar, etc. to an electric motor disposed inside the housing, via a glass terminal that is provided in the inverter housing section so as to penetrate through the housing. In Patent Document 1, a device is disclosed that outputs three-phase alternating current power, which is converted at an inverter module, to a glass terminal via a UVW busbar that is integrally insert-molded using a resin material.

CITATION LIST

Patent Literature

Patent Document 1: Japanese Patent No. 4898931

SUMMARY OF INVENTION

Technical Problem

The UVW busbar incorporated into the inverter device has been configured by integrally insert-molding three conductive material busbars, which are generally formed by rigid and relatively thick copper plates, etc., using a resin material. Furthermore, the UVW busbar has been electrically connected to the glass terminal by welding. Then, in recent years, cost reduction and weigh reduction have been pursued by making the busbar thinner. Furthermore, in order to eliminate a welding operation, there has been an attempt to change the connection to the glass terminal to a connector connection.

However, when the conductive material busbar, on which is provided a connector terminal to one end of which the glass terminal is connected, is insert-molded using the resin material, the insert-molding becomes difficult as the resin material enters into a terminal hole. Meanwhile, when it comes to the thinner conductive material busbar, when the insert-molding becomes difficult, the thinner conductive material busbar becomes more likely to vibrate due to the lack of rigidity. As a result of the vibration, there have been concerns about damage to the busbar itself, an impact on the circuit board, and potential deterioration of its insulating properties. In particular, given the circuit configuration of the circuit board, when a distance between the UVW land and the glass terminal becomes greater, the length of the busbar becomes longer. Thus, it becomes essential to take anti-vibration measures.

The present invention is made in light of the above-described circumstances, and an object of the present invention is to provide an inverter-integrated electric compressor that is capable of securing vibration resistance even when a UVW busbar is made thinner, inhibiting damage to the inverter-integrated electric compressor itself and a negative impact on the circuit board side, improving reliability of an inverter device, and securing insulating properties and ease of assembly.

Solution to Problem

The inverter-integrated electric compressor of the present invention employs the following means to solve the above problems.

Specifically, an inverter-integrated electric compressor according to a first aspect of the present invention includes an inverter device integrally incorporated into an inverter housing section that is provided on a housing, the inverter device including a circuit board on which is mounted an inverter circuit. The inverter-integrated electric compressor includes a UVW busbar that conducts three-phase alternating current power converted by the inverter circuit on the circuit board to a glass terminal that penetrates the inverter housing section. The UVW busbar is configured of three long thin plate-shaped conductive material busbars, one end of each being provided with a connector terminal that is connected to the glass terminal. The three conductive material busbars are housed in and integrated with a resin case. A section of each of the conductive material busbars in at least one location in the length direction thereof is adhered and fixed to the resin case side using adhesive.

According to the first aspect of the present invention, the inverter-integrated electric compressor has a configuration that integrally incorporates the inverter device, and the UVW busbar that conducts the three-phase alternating current power converted by the inverter circuit on the circuit board to the glass terminal that penetrates the inverter housing section is configured of the three long thin plate-shaped conductive material busbars, one end of each provided with the connector terminal that connects to the glass terminal, while the three conductive material busbars are housed in and integrated with the resin case. A section of each of the conductive material busbars in the at least one location along the length direction thereof is adhered and fixed to the resin case side using the adhesive. As a result, by the UVW busbar that electrically connects a UVW land on the circuit board to the glass terminal being configured of the three long thin plate-shaped conductive material busbars that are housed in and integrated with the resin case, it is possible to hold the three conductive material busbars as a single component, and it is also possible to insulate them. Furthermore, by adhering and fixing a section in at least one location along the length direction of the three long thin plate-shaped conductive material busbars to the resin case side using the adhesive, it is possible to suppress vibrations in those locations. As a result, it is possible to make the UVW busbar thinner and achieve cost reductions, and moreover, it is possible to reliably secure the insulating properties and ease of assembly of the UVW busbar. Furthermore, by suppressing the vibrations, it is possible to inhibit damage to the busbar itself and a negative impact on the circuit board side, and the reliability of the inverter device can be improved.

In addition, in the inverter-integrated electric compressor according to a second aspect of the present invention, the conductive material busbars are formed in a shape having a curved portion in order to correspond to an arrangement of circuit components on the circuit board, and the locations where the conductive material busbars are adhered and fixed using the adhesive are set to be the curved portions or a specific range that includes the curved portions.

According to the second aspect of the present invention, the conductive material busbars are formed in the shape having a curved portion in order to correspond to the arrangement of the circuit components on the circuit board, and the locations where the conductive material busbars are adhered and fixed using the adhesive are set to be the curved portions or a specific range that includes the curved portions. As a result, the curved portions are provided in order to correspond to the arrangement of the circuit components on the circuit board, and, with respect to the conductive material busbars for which the vibration amplitude is larger in the vicinity of the curved portions, the fixing locations (potting locations) are set to be the curved portions or the specific range that includes the curved portions, and these parts are adhered and fixed using the adhesive. It is thus possible to effectively suppress the vibrations. As a result, it is possible to improve the vibration resistance of the UVW busbar, and to enhance the vibration resistance reliability of the inverter device.

Furthermore, in the inverter-integrated electric compressor according to a third aspect of the present invention, with respect to the above-described inverter-integrated electric compressor, the adhering and fixing locations using the adhesive are set to correspond to sections at which a vibration amplitude measured by vibration analysis of the conductive material busbars is largest.

According to the third aspect of the present invention, the adhering and fixing locations using the adhesive are set to correspond to sections at which the vibration amplitude measured by vibration analysis of the conductive material busbars is largest. Thus, as a result of the vibrational analysis, sections of the conductive material busbars at which the vibration amplitude is largest are adhered and fixed using the adhesive, and it is therefore possible to maximize a vibration suppression effect of the UVW busbar. As a result, it is possible to even further improve the vibration resistance of the UVW busbar, and to further enhance the vibration resistance reliability of the inverter device.

In addition, in the inverter-integrated electric compressor according to a fourth aspect of the present invention, with respect to any one of the above-described inverter-integrated electric compressors, grooves that house the conductive material busbars are formed inside the resin case, and the conductive material busbars that are housed and installed in the grooves are adhered and fixed to the grooves using the adhesive.

According to the fourth aspect of the present invention, the grooves that house the conductive material busbars are formed inside the resin case, and the conductive material busbars that are housed and installed in the grooves are adhered and fixed to the grooves using the adhesive. Thus, by housing the conductive material busbars inside the grooves of the resin case, the vibration amplitude of the conductive material busbars is regulated. By potting (injection solidifying) of the adhesive in the grooves, it is possible to adhere and fix the conductive material busbars inside the grooves. As a result, it is possible to more reliably fix the conductive material busbars and suppress the vibrations thereof.

In addition, in the inverter-integrated electric compressor according to a fifth aspect of the present invention, with respect to any one of the above-described inverter-integrated electric compressors, the UVW busbar is fixed and installed by the resin case itself being screwed to the circuit board.

According to the fifth aspect of the present invention, the UVW busbar is fixed and installed by the resin case itself being screwed to the circuit board. Therefore, fixing points of the UVW busbar can be increased, in addition to connecting portions to the glass terminal and the circuit board, by fixing and installing the resin case itself with respect to the circuit board. As a result, it is possible to even further improve the vibration resistance of the UVW busbar, and to further enhance the vibration resistance reliability of the inverter device.

Advantageous Effects of Invention

According to the present invention, by the UVW busbar that electrically connects the UVW land on the circuit board to the glass terminal being configured of the three long thin plate-shaped conductive material busbars that are housed in and integrated with the resin case, it is possible to hold the three conductive material busbars as a single component, and it is also possible to insulate them. Furthermore, by adhering and fixing a section in at least one location in the length direction of the three long thin plate-shaped conductive material busbars to the resin case side using the adhesive, it is possible to suppress vibrations in those locations. As a result, it is possible to make the UVW busbar thinner and achieve cost reductions, and moreover, it is possible to reliably secure the insulating properties and ease of assembly of the UVW busbar. Furthermore, by suppressing the vibrations, it is possible to inhibit damage to the busbar itself and a negative impact on the circuit board side, and the reliability of the inverter device can be improved.

DESCRIPTION OF EMBODIMENTS

An embodiment of the present invention will be described below with reference to FIGS. 1 to 6.

Figure 1:
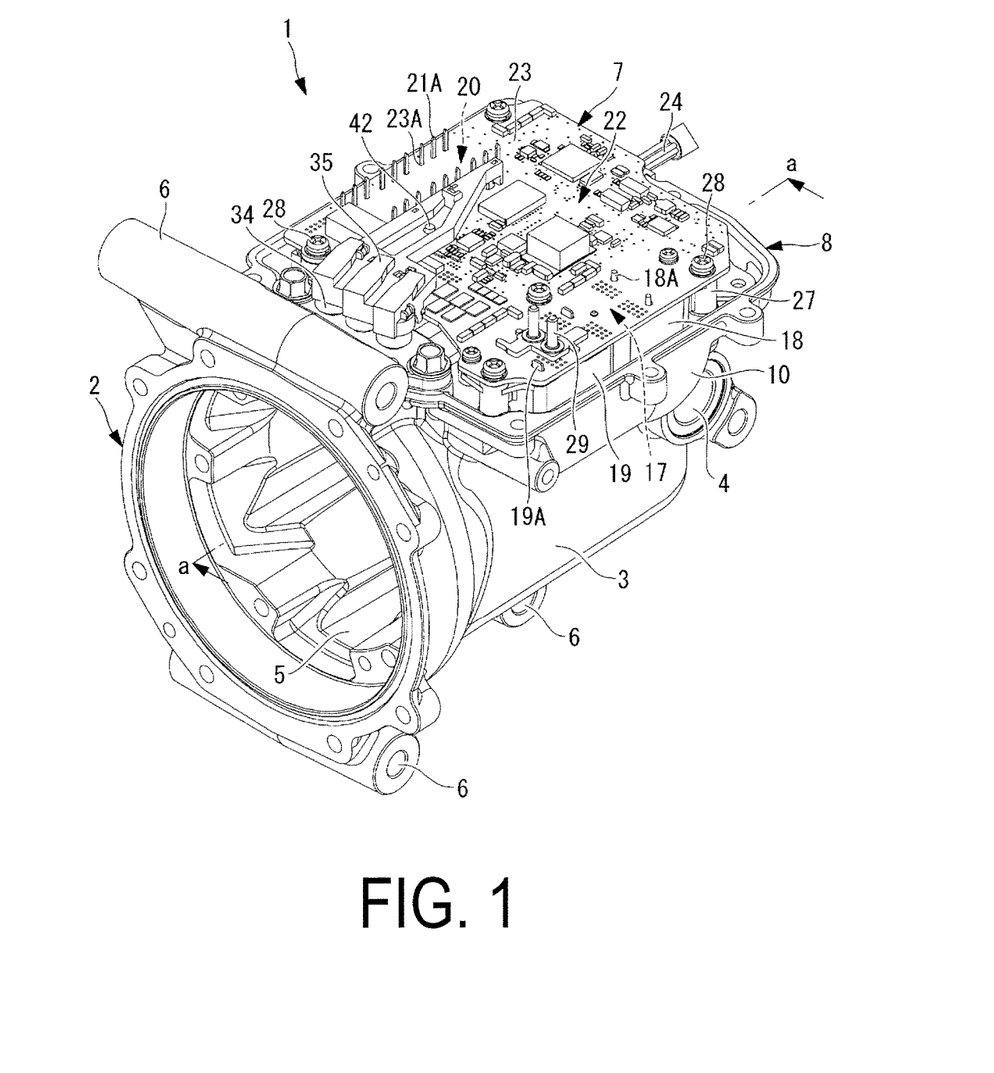
FIG. 1 is a perspective view illustrating a configuration of main components of an inverter-integrated electric compressor according to an embodiment of the present invention.
Figure 2:
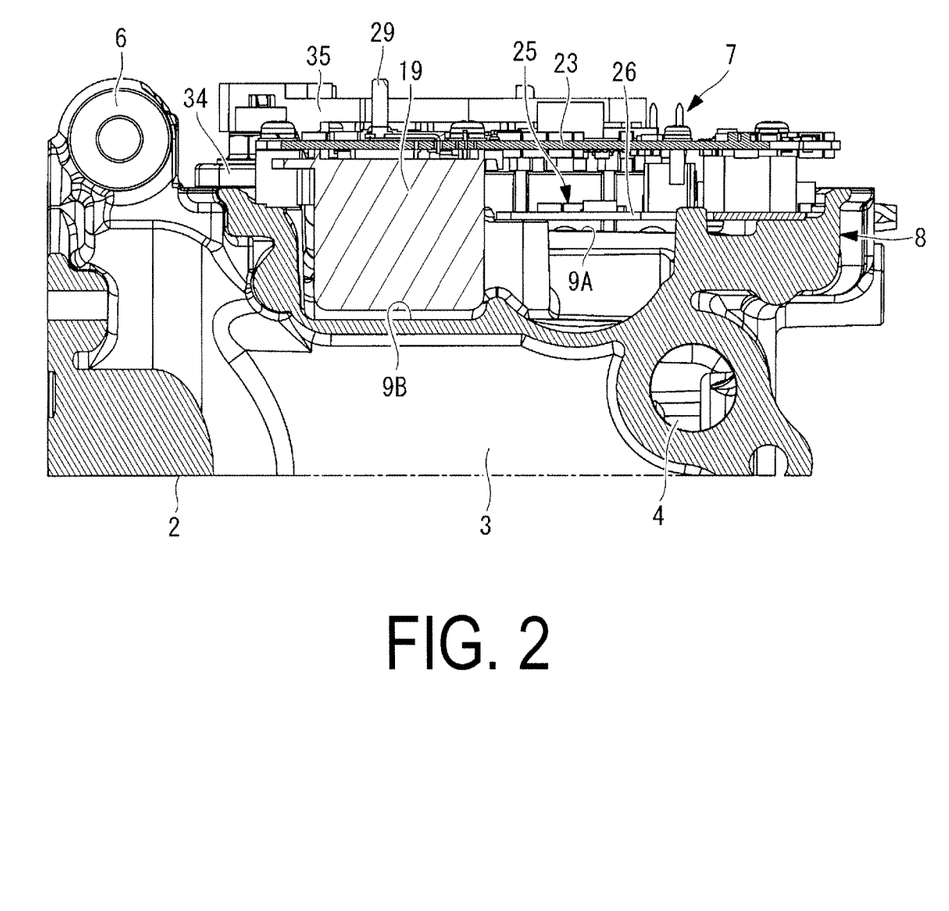
FIG. 2 is a corresponding longitudinal cross-sectional view along the line a-a in FIG. 1.
Figure 3:
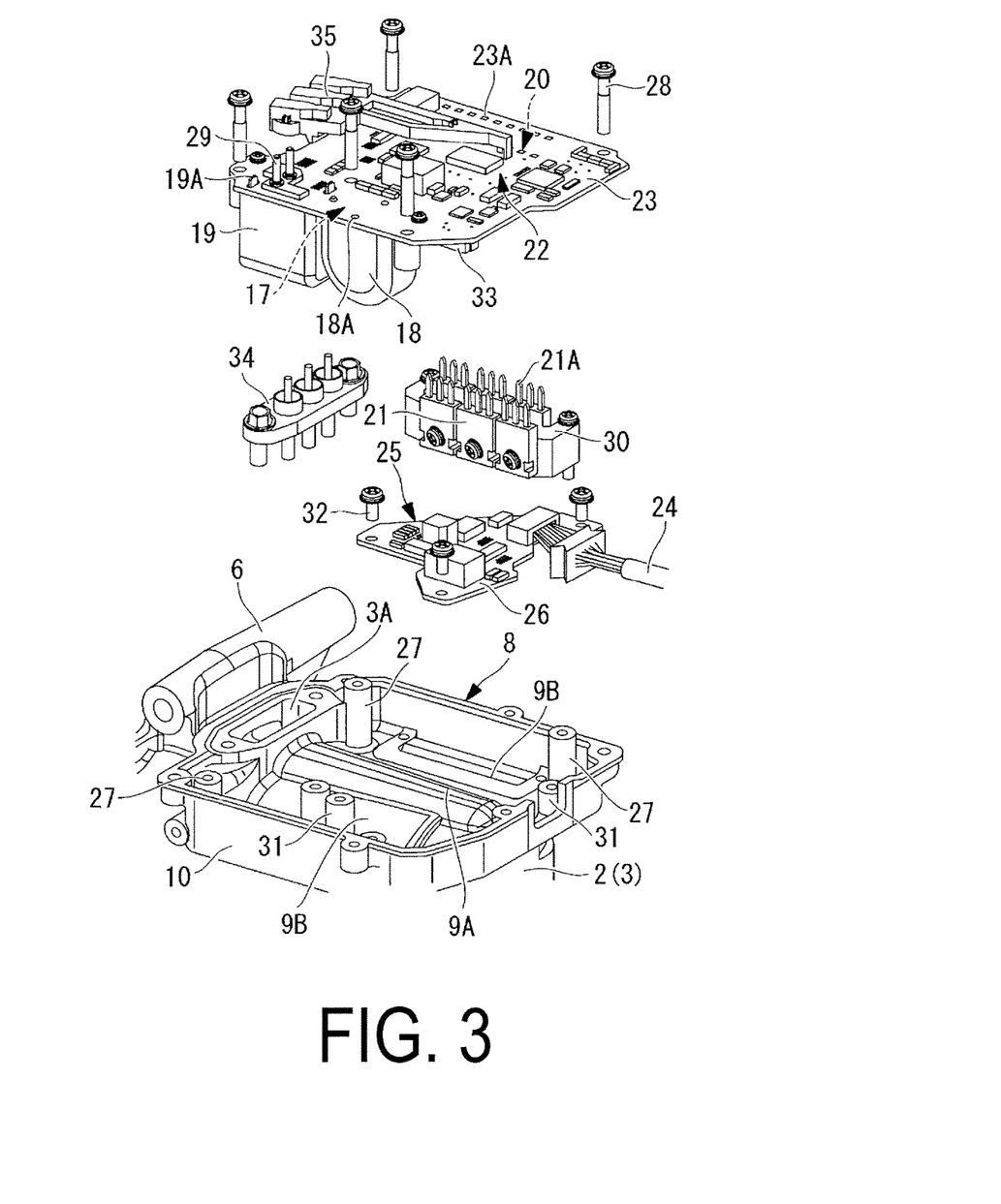
FIG. 3 is an exploded perspective view of an inverter device that is integrally incorporated into the inverter-integrated electric compressor.
Figure 4:
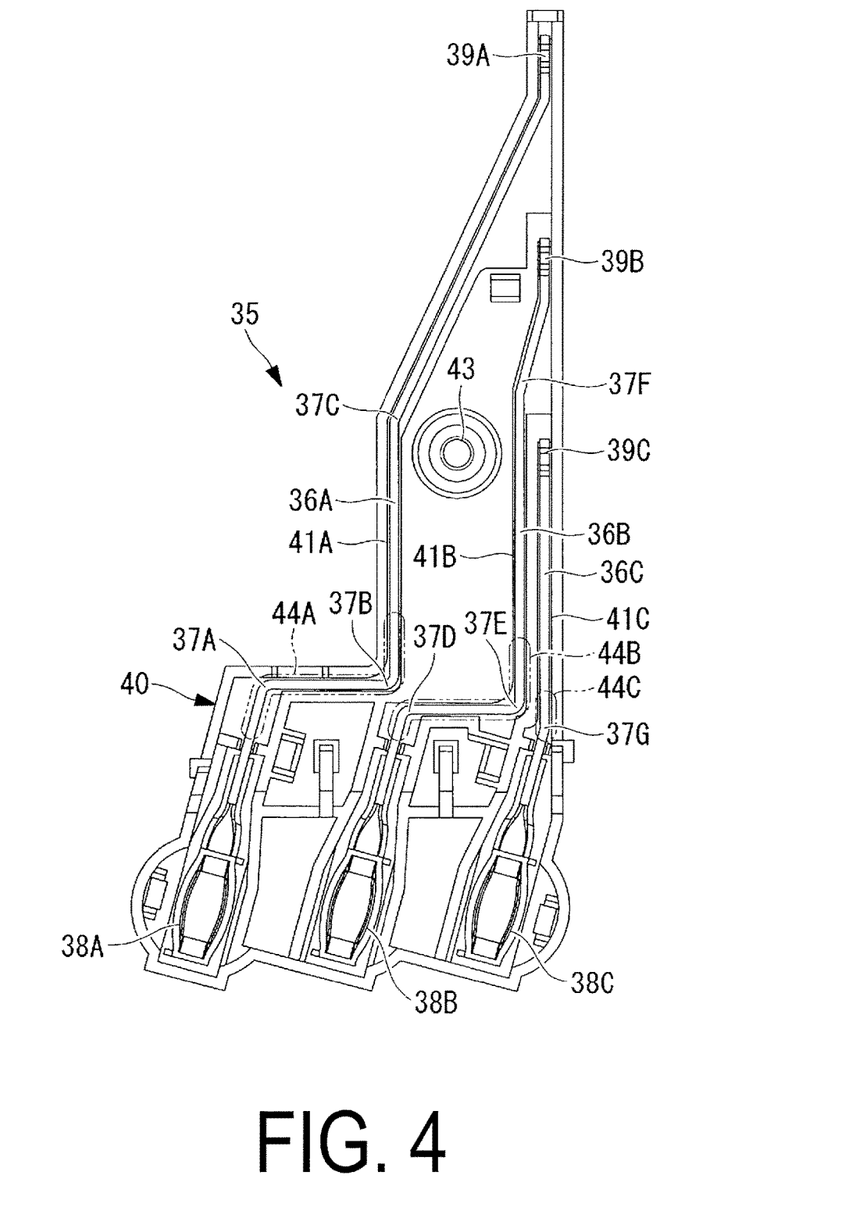
FIG. 4 is a configuration diagram of a back-side of a UVW busbar that is applied to the inverter device.
Figure 5:
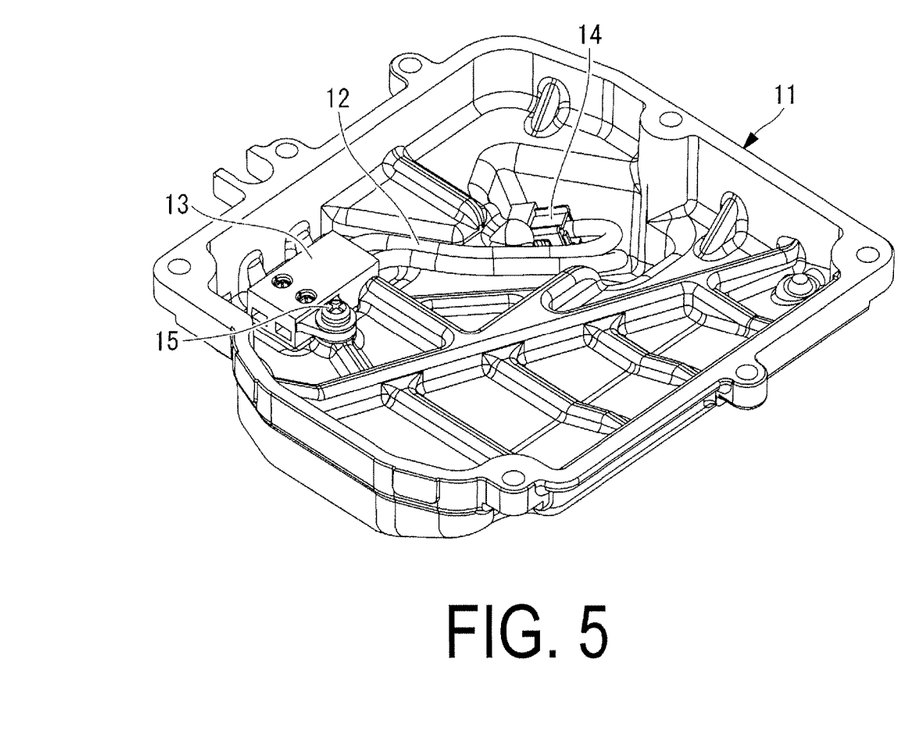
FIG. 5 is a perspective view of a back-side of a cover that seals an inverter housing section of the inverter-integrated electric compressor.
Figure 6:
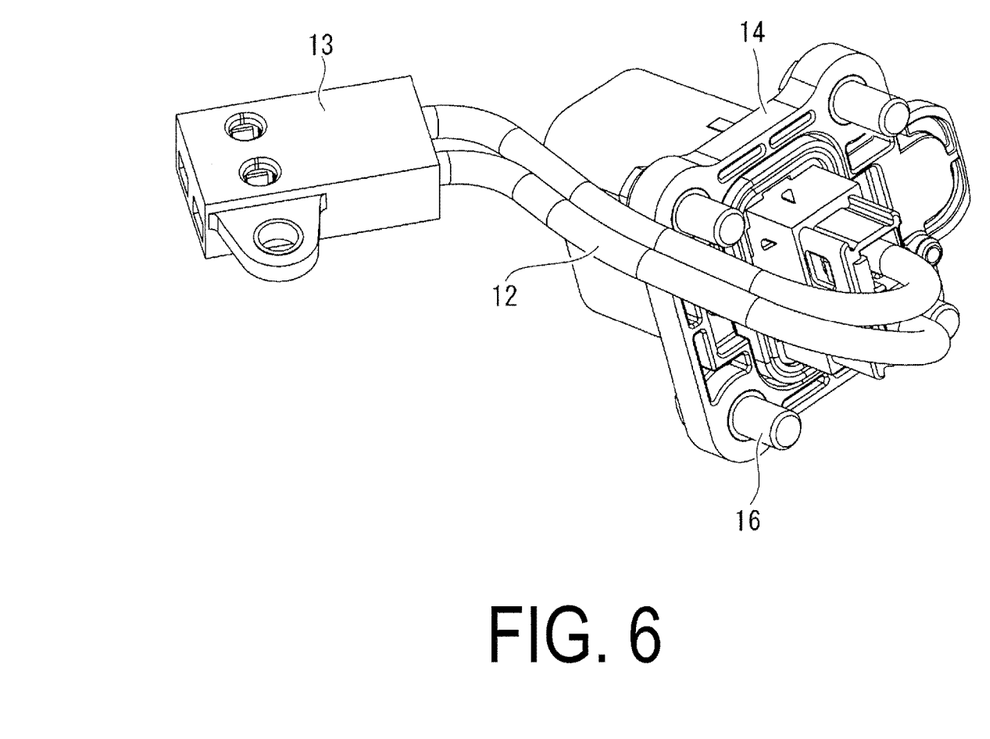
FIG. 6 is a perspective view of a power source cable unit connected to the cover.

FIG. 1 is a perspective view illustrating a configuration of main components of an inverter-integrated electric compressor according to an embodiment of the present invention. FIG. 2 is a longitudinal cross-sectional view along the line a-a in FIG. 1. FIG. 3 is an exploded perspective view of an inverter device, FIG. 4 is a configuration diagram of a UVW busbar, FIG. 5 is a perspective view of a back-side of a cover that seals an inverter housing section, and FIG. 6 is a perspective view of a power source cable unit.

The inverter-integrated electric compressor 1 is provided with a cylindrical housing 2 configuring an outer shell. The housing 2 is configured by integrally combining an aluminum die-cast motor housing 3 with a built-in electric motor (not illustrated) and an aluminum die-cast compressor housing (not illustrated) with a built-in compression mechanism (not illustrated).

Here, the inverter-integrated electric compressor 1 is configured so that an electric motor disposed inside a housing 2 and a compression mechanism are connected via a rotating shaft, the compression mechanism is driven as a result of the electric motor being driven to rotate via an inverter device 7, which will be described below. Low-pressure refrigerant gas, which is sucked into the interior via an intake port 4 provided in a side surface of a motor housing 3 on the rear end side thereof, is sucked in through the periphery of the electric motor, and the low-pressure gas is compressed by the compression mechanism, discharged into the interior of a compressor housing, and then discharged to the outside.

The motor housing 3 has a plurality of refrigerant flow paths 5 formed therein to allow refrigerant to flow in the axial direction along the inner circumferential surface thereof, and a plurality of legs 6 for mounting the electric compressor 1 provided on the outer circumference thereof. An inverter housing section 8 is also integrally formed on the outer circumference of the housing 2 (on the motor housing 3 side) for integrally incorporating the inverter device 7. The inverter housing section 8 is configured so that a plan view thereof has a rectangular shape, a bottom portion thereof has a shape that extends along the outer circumferential wall of the motor housing 3, a convex-shaped ridge line portion 9A corresponding to a refrigerant flow path 5 is formed in a central portion thereof, a concave portion 9B is formed along the outer circumferential wall of the housing on both side portions thereof, and a flange 10 is raised up therearound.

In the motor housing 3, a draft angle is provided from the front end, on which the compressor housing is connected, toward the rear end. Furthermore, as the refrigerant flow path 5 that is provided on the inner circumferential side has a larger cross-sectional area toward the compression mechanism side from the intake port 4 side, the ridge line portion 9A, etc. that are formed in the bottom surface inside the inverter housing section 8 are also configured so as to be inclined downward from the front toward the rear side.

The inverter housing part 8 is configured to be sealed by attaching a cover 11 illustrated in FIG. 5 to the flange 10 after incorporating the inverter device 7. A high-voltage cable (power source cable) 12 is provided on the inner surface side of the cover 11. As illustrated in FIG. 6, a connector 13 is provided on one end of the high-voltage cable 12, and a connector terminal 14, which is connected to the power source cable, is provided on the other end of the high-voltage cable 12. The connector 13 on the one end is configured to be installed on the inner surface of the cover 11 by being fixed by a screw 15, in a position corresponding to a P-N terminal 29 that is provided on a main circuit board 23, which will be described later. The connector terminal 14 on the other end is configured to be installed, in a state in which a terminal portion thereof protrudes to the outer surface side of the cover 11, by being fixed by a plurality of screws 16 from the outer surface side.

The high-voltage cable 12 forms a part of the power source cable, and is connected via the power source cable to a power supply unit that is installed in a vehicle. The high-voltage cable 12 is a cable for inputting high voltage direct current power supplied from the power supply unit into the inverter device 7, by the connector 13 provided on the one end thereof being connected to the P-N terminal 29 provided on the main circuit board 23 of the inverter device 7.

As is known, the inverter device 7 converts high voltage direct current power supplied from the power supply unit installed in the vehicle to three-phase alternating current power of a required frequency based on a command from a host controller, and applies the alternating current power to an electric motor to rotate and drive the electric motor. As illustrated in FIG. 1 to FIG. 3, the inverter device 7 is integrally incorporated with the inverter housing part 8 provided on the outer periphery of the housing 2.

The inverter device 7 is configured by the following: a plurality of high-voltage electrical components (hereinafter also referred to simply as electrical components), such as a coil 18 and a capacitor 19 in a case that configure a known noise-removing filter circuit 17; a plurality (six) of semiconductor switching elements 21 each formed of a heat generating power transistor, such as an IGBT, that configure a known switching circuit 20 that converts direct current power to three-phase alternating current power; the rectangular main circuit board (hereinafter also referred to as circuit board) 23 on which is mounted a control circuit (an inverter circuit) 22 that includes an inverter circuit, which includes the filter circuit 17 and the switching circuit 20, a microcomputer that controls the inverter circuit, and the like; and a sub-circuit board 26 or the like that is provided with a communication circuit 25 to which is connected a communication cable 24 from a host control device.

The inverter device 7 may be a known device, but here, a device is used in which, as the main circuit board 23, the electrical components, such as the coil 18 and the capacitor 19 that configure the filter circuit 17, are mounted by soldering lead terminals 18A and 19A thereof, and the switching circuit 20, which is configured by the plurality (six) of semiconductor switching elements 21 each formed of the heat generating power transistor, such as the IGBT, is mounted by soldering lead terminals 21A thereof (there are a total of 18 lead terminals 21A, three for each IGBT).

In other words, in the main circuit board 23, the filter circuit 17 and the switching circuit 20 are configured on the main circuit board 23 by the lead terminals 18A and 19A of the coil 18 and the capacitor 19 configuring the filter circuit 17 and the lead terminals 21A of the plurality of semiconductor switching elements 21 configuring the switching circuit 20 passing through respective through-holes in the main circuit board 23, and these lead terminals being soldered and mounted on the circuit board in a pattern. The main circuit board 23 is fixed by fastening the four corners of the main circuit board 23, using screws 28, to bosses 27 provided in the four corners inside the inverter housing section 8.

The capacitor 19 which is one of the high-voltage electrical components configuring the filter circuit 17 is configured to be housed in a case and the outer shape is set to a square shape (a cuboid shape) and the upper surface is set to a flat planar shape as illustrated in FIG. 2 and FIG. 3. In the same manner, the coil 18 wound into a cylindrical shape is configured to be housed in a case with a semi-cylindrical shape of which the upper surface is a flat planar shape. Then, the coil 18 and the capacitor 19 are mounted so that they are aligned along one side of the rectangular main circuit board 23.

In addition, the coil 18 and the capacitor 19 mounted on the main circuit board 23 are configured to be fixed and installed, using an adhesive, on the bottom surface that is the concave portion 9B of one side along the axial direction of the outer circumferential wall of the cylindrical housing 2 that forms the bottom surface inside the inverter housing part 8, so that the lower surface of the main circuit board 23 is supported by the respective flat upper surfaces thereof. It is thus possible to support stress and vibration applied to the main circuit board 23. In addition, in the manner described above, the P-N terminal 29, which inputs direct current power from the power supply to the inverter device 7, is configured to be upwardly erect, as a result of the connector 13 of the high-voltage cable 12 being connected on the upper surface side of a section supported by the capacitor 19 in the main circuit board 23 of which the bottom surface is supported by the coil 18 and the capacitor 19.

In addition, as illustrated in FIG. 3, in the inverter housing section 8, the plurality (six) of semiconductor switching elements 21 is fixed and installed on a heat-radiating block 30 that is erected on the concave surface 9B on the other side in the axial direction of the outer circumferential wall of the cylindrical housing 2 forming the bottom surface of the inverter housing section 8. The heat-radiating block 30 is a cuboid block with a predetermined length and is made of aluminum alloy, which is a heat conductive material. The heat-radiating block 30 is three-dimensionally installed with the semiconductor switching elements 21 being screwed and fixed in sets of three on the vertical side surfaces of both the left and right sides thereof with the three lead terminals 21A facing vertically upward. The heat-radiating block 30 dissipates heat generated by the semiconductor switching elements 21 to the housing 2 side and has a function of cooling the semiconductor switching elements 21.

As illustrated in FIG. 1, a total of 18 of the lead terminals 21A of the plurality of semiconductor switching elements 21 installed as described above are configured to protrude upward passing through through-holes 23A provided along the other side opposing the one side of the main circuit board 23 which is supported by the coil 18 and capacitor 19. The lead terminals 21A are mounted on the main circuit board 23 by being soldered at this section. Due to this, the configuration is able to support the other side opposing the one side of the main circuit board 23 from below with multiple lead terminals 21A of the plurality of semiconductor switching elements 21. Here, the heat-radiating block 30 is screwed and fixed on the concave surface 9B inside the inverter housing section 8. However, the heat-radiating block 30 may be configured to be integrally formed on the motor housing 3 side.

Furthermore, to the rear of the central section of the bottom surface of the inverter housing section 8, the sub-circuit board 26, on which the communication circuit 25 to which the communication cable 24 is connected is mounted, is fixed and installed on boss 31 in three locations, via screws 32, so that the sub-circuit board 26 does not come into contact with the concave-shaped ridge line portion 9A. The sub-circuit board 26 is provided between the coil 18 and the capacitor 19, which are disposed on both the left and right sides of the inverter housing section 8, and the plurality of semiconductor switching elements 21, and is configured so that the main circuit board 23 is disposed above the sub-circuit board 26. The sub-circuit board 26 is electrically and mechanically connected with the main circuit board 23 disposed above it, via an inter-circuit board connection terminal 33 (refer to FIG. 3). Accordingly, the inter-circuit board connection terminal 33 is also configured to support the main circuit board 23 from below.

In addition, the power converted from direct current power to three-phase alternating current power by passing through the switching circuit 20 of the inverter device 7 is output from the main circuit board 23 side to a glass terminal 34, via a UVW busbar 35. The glass terminal 34 is installed in a terminal installation hole 3A (refer to FIG. 3) provided so as to pass through the motor housing 3 in a section at the front inside the inverter housing section 8. The glass terminal 34 applies the three-phase alternating current power output from the inverter device 7 via the UVW busbar 35 to the electric motor in the motor housing 3.

One end side of the UVW busbar 35 is connected to a UVW land on the main circuit board 23, and the other end side is connected to the glass terminal 34. As illustrated in FIG. 4, the UVW busbar 35 is configured by conductive material busbars 36A, 36B, 36C, which are formed by three long thin plates of sheet copper or the like of a U phase, a V phase, and a W phase, a resin case 40 that houses and is integrally formed with the three conductive material busbars 36A, 36B, 36C, and a lid member not illustrated that is detachably mounted on the bottom surface of the resin case.

In order to avoid interference with circuit components disposed on the main circuit board 23, each of the three conductive material busbars 36A, 36B, 36C is formed in a shape provided with at least one of curved portion 37A, 37B, 37C, 37D, 37E, 37F, 37G etc., that include a crank-shaped curved portion. Connector terminals 38A, 38B, and 38C, which are provided with terminal holes that are connected to UVW terminals of the glass terminal 34 by insertion, are provided on each of end portions of the busbars 36A, 36B, 36C on the side connected to the glass terminal 34. Meanwhile, the other ends form connecting portions 39A, 39B, and 39C with respect to the UVW land on the main circuit board 23.

Furthermore, the resin case 40 has a shape that spreads in a fan shape from one end side to the other end side, and is configured so that three grooves 41A, 41B, 41C are integrally formed on an inner surface thereof. The three grooves 41A, 41B, 41C are configured so that the three conductive material busbars 36A, 36B, 36C and the connector terminals 38A, 38B, and 38C are inserted and housed therein. Furthermore, the resin case 40 is configured to be integrally formed with the three conductive material busbars 36A, 36B, 36C and thereby form the UVW busbar 35 as an integrated component. The resin case 40 is configured to be provided with a screw boss 43 in a substantially central section thereof, the screw boss 43 solidly installing the resin case 40 on the main circuit board 23, via a screw 42.

In addition, it is clear from vibration analysis that, during traveling of the vehicle, the long thin plate-shaped conductive material busbars 36A, 36B, 36C are subject to the influence of road surface vibrations, etc. and vibrate significantly. In particular, it has been demonstrated that the vibration amplitude is larger in the vicinity of the curved portions 37A, 37B, 37D, and 37E that are curved in the crank shape.

Here, in the present embodiment, when the long thin plate-shaped conductive material busbars 36A, 36B, 36C are housed and installed inside the resin case 40, in order to suppress the vibrations, the curved portions 37A, 37B, 37D, 37E, 37G, or a specific range that includes those curved portions, are set as fixing locations 44A, 44B, and 44C, and each of the conductive material busbars 36A, 36B, 36C is adhered and fixed with respect to the grooves 41A, 41B, 41C in at least one location in that range, by potting (injection solidifying) a resin adhesive.

As described above, in the present embodiment, not only is the main circuit board 23, which is installed in the inverter housing section 8, fixed by fastening the four corners thereof to the bosses 27 using the screws 28, but one side of the main circuit board 23 is also supported from below using the coil 18 and the capacitor 19 which constitute the plurality of high-voltage electrical components configuring the filter circuit 17 of the inverter device 7, and the opposing other side is supported from below by the multiple lead terminals 21A of the plurality of semiconductor switching elements 21 such as IGBTs configuring the switching circuit 20 of the inverter device 7. In addition, the center region of the main circuit board 23 is supported from below by the inter-circuit board connection terminal 31 that is electrically and mechanically connected between the main circuit board 23 and the sub-circuit board 26 arranged below the main circuit board 23.

For this reason, vibration force applied to the main circuit board 23 due to vibrations during traveling of the vehicle or the like and stress such as pressing force applied to the main circuit board 23 when inserting the connector 13 into the P-N terminal 29 are dispersed and alleviated by providing the multiple support points and fixing points as described above, and it is thus possible to improve the vibration resistance.

Furthermore, electric power that is converted to three-phase alternating current power of a required frequency at the main circuit board 23 is output from the UVW land thereof to the glass terminal 34 via the UVW busbar 35, and is applied to the electric motor provided inside the housing 2 by the glass terminal 34 that penetrates the inverter housing section 8. Here, in place of integrally insert-molding the three long thin plate-shaped conductive material busbars 36A, 36B, 36C that configure the UVW busbar 35 using a resin material, the three conductive material busbars 36A, 36B, 36C are configured as the integrated component, namely, the UVW busbar 35 that is housed and installed inside the resin case 40 so as not to cause the terminal holes of the connector terminals 38A, 38B, and 38C to be covered with the resin material.

Then, a configuration is adopted in which locations at which the vibration amplitude to which the long thin plate-shaped conductive material busbars 36A, 36B, 36C are subject due to road surface vibrations or the like is particularly large (it is possible to identify those locations in advance using vibration analysis) are adhered and fixed by potting (injection solidifying) the resin adhesive with respect to the grooves 41A, 41B, 41C inside the resin case 40. As a result, it is possible to increase rigidity and suppress the vibrations.

Thus, according to the present embodiment, a configuration is adopted in which, in the UVW busbar 35 that conducts the three-phase alternating current power converted by the inverter circuit 22 on the main circuit board (circuit board) 23 to the glass terminal 34 that penetrates the inverter housing section 8, the three long thin plate-shaped conductive material busbars 36A, 36B, 36C, one end of each of which is provided with the connector terminals 38A, 38B, and 38C that are connected to the glass terminal 34, are housed in and integrated with the resin case 40, and at least one section in the length direction of the conductive material busbars 36A, 36B, 36C is adhered and fixed to the resin case 40 side using the adhesive.

In this manner, the UVW busbar 35, which electrically connects the UVW land on the main circuit board 23 with the glass terminal 34, is configured so that the long thin plate-shaped conductive material busbars 36A, 36B, 36C are housed and integrated with the resin case 40. In this manner, the three conductive material busbars 36A, 36B, 36C can be held and also insulated as one integrated component. Furthermore, a section at least one location in the length direction of the three long thin plate-shaped conductive material busbars 36A, 36B, 36C is adhered and fixed on the resin case 40 side using the adhesive, and it is thus possible to suppress the vibrations in those locations. As a result, it is possible to make the UVW busbar 35 thinner and achieve cost reductions, and moreover, it is possible to reliably secure the insulating properties and ease of assembly of the UVW busbar 35. Furthermore, by suppressing the vibrations, it is possible to inhibit damage to the busbar 35 itself and a negative impact on the circuit board side, and the reliability of the inverter device 7 can be improved.

In addition, the conductive material busbars 36A, 36B, 36C have the shape in which they are provided with the curved portions 37A to 37G so as to correspond to an arrangement of the circuit components on the main circuit board 23, and the locations 44A, 44B, and 44C at which the conductive material busbars 36A, 36B, 36C are adhered and fixed using the adhesive are set to be the curved portions 37A, 37B, 37D, 37E, 37G or the specific range that includes those curved portions. Thus, the curved portions 37A to 37G are provided so as to correspond to the arrangement of the circuit components on the main circuit board 23, and, with respect to the conductive material busbars 36A, 36B, 36C for which the vibration amplitude is larger in the vicinity of the curved portions 37A, 37B, 37D, 37E, 37G, the fixing locations (potting locations) 44A, 44B, and 44C are set to be the curved portions 37A, 37B, 37D, 37E, 37G or the specific range that includes those curved portions, and these regions are adhered and fixed using the adhesive.

In this manner, with respect to the conductive material busbars 36A, 36B, 36C, specific sections in the length direction at which the vibration amplitude is larger are set as the fixing locations (potting locations) 44A, 44B, and 44C, and, by adhering and fixing these regions by potting, it is possible to more effectively suppress the vibrations. As a result, it is possible to improve the vibration resistance of the UVW busbar 35, and to enhance the vibration resistance reliability of the inverter device 7.

In addition, the adhering and fixing locations 44A, 44B, and 44C using the adhesive are set to be sections at which the vibration amplitude is largest, on the basis of vibration analysis of the conductive material busbars 36A, 36B, 36C. Thus, as a result of the vibration analysis, the sections of the conductive material busbars 36A, 36B, 36C at which the vibration amplitude is largest are adhered and fixed using the adhesive, and thus, it is possible to maximize a vibration suppression effect of the UVW busbar 35. As a result, it is possible to even further improve the vibration resistance of the UVW busbar 35, and to further enhance the vibration resistance reliability of the inverter device 7.

Furthermore, in the present embodiment, the grooves 41A, 41B, 41C that house the conductive material busbars 36A, 36B, 36C are formed inside the resin case 40, and the conductive material busbars 36A, 36B, 36C that are housed and installed inside the grooves 41A, 41B, 41C are adhered and fixed to the grooves 41A, 41B, 41C using the adhesive. Therefore, by housing the conductive material busbars 36A, 36B, 36C inside the grooves 41A, 41B, 41C of the resin case 40, it is possible to regulate the vibration amplitude of the conductive material busbars 36A, 36B, 36C, and furthermore, by potting (injection solidifying) the adhesive inside the grooves 41A, 41B, 41C, it is possible to adhere and fix the conductive material busbars 36A, 36B, 36C inside the grooves 41A, 41B, 41C. As a result, it is possible to more reliably fix the conductive material busbars 36A, 36B, 36C and suppress the vibrations thereof.

In addition, the UVW busbar 35 is configured so that the resin case 40 itself is fixed and installed on the main circuit board 23 by being screwed in place using the screw 42. As a result, fixing points of the UVW busbar 35 can be increased, in addition to the connecting portions to the glass terminal 34 and the main circuit board 23, by fixing and installing the resin case 40 itself with respect to the main circuit board 23. Thus, it is possible to even further improve the vibration resistance of the UVW busbar 35, and to further enhance the vibration resistance reliability of the inverter device 7.

Note that the present invention is not limited to the invention according to the embodiment as described above, and changes can be made as appropriate without departing from the gist thereof. For example, in the embodiment described above, the P-N terminal 24 installed on the upper surface of the main circuit board 23 is configured to be installed at a position above the capacitor 19. However, the P-N terminal 24 may be configured to be installed at a position above the coil 18. In addition, the heat-radiating block 30 for installing the plurality of semiconductor switching elements 21 has a cuboid shape; however, as long as the side surfaces on which the plurality of semiconductor switching elements 21 is fixed and installed are vertical surfaces, it is not always necessary for the heat-radiating block 30 to have a cuboid shape. Furthermore, the main circuit board 23 may be supported and fixed at support points and fixing points other than the support points and fixing points described in the embodiment above.

Furthermore, in the above-described embodiment, each of the conductive material busbars 36A, 36B, 36C of the UVW busbar 35 is fixed by resin potting in one location in the grooves 41A, 41B, 41C of the resin case 40, but it need not necessarily be one location, and potting may be carried out in a plurality of locations as appropriate, with intervals therebetween, or the potting may be carried out over a specific width.

REFERENCE SIGNS LIST

1 Inverter-integrated electric compressor
2 Housing
3 Motor housing
7 Inverter device
8 Inverter housing section
22 Control circuit (inverter circuit)
23 Main circuit board (circuit board)
34 Glass terminal
35 UVW busbar
36A, 36B, 36C Conductive material busbar
37A, 37B, 37D, 37E, 37G Curved portion
38A, 38B, 38C Connector terminal
40 Resin case
41A, 41B, 41C Groove
42 Screw
43 Screw boss
44A, 44B, 44C Adhering and fixing location (potting location)

The invention claimed is:

1. An inverter-integrated electric compressor including an inverter device integrally incorporated into an inverter housing section that is provided on a housing, the inverter device including a circuit board on which is mounted an inverter circuit, the inverter-integrated electric compressor comprising:
a UVW busbar that conducts three-phase alternating current power converted by the inverter circuit on the circuit board to a glass terminal that penetrates the inverter housing section,
the UVW busbar being configured of three long thin plate-shaped conductive material busbars, one end of each being provided with a connector terminal that is connected to the glass terminal, and the three conductive material busbars being housed in and integrated with a resin case, and
a section of each of the conductive material busbars in at least one location in the length direction thereof being adhered and fixed to the resin case side using adhesive,
wherein grooves that house the conductive material busbars are formed inside the resin case, and the conductive material busbars that are housed and installed in the grooves are adhered and fixed to the grooves using the adhesive.

2. The inverter-integrated electric compressor according to claim 1, wherein the conductive material busbars are formed in a shape having a curved portion in order to correspond to an arrangement of circuit components on the circuit board, and the locations where the conductive material busbars are adhered and fixed using the adhesive are set to be the curved portions or a specific range that includes the curved portions.

3. The inverter-integrated electric compressor according to claim 2, wherein the adhering and fixing locations using the adhesive are set to correspond to sections at which vibration amplitude measured by vibration analysis of the conductive material busbars is largest.

4. The inverter-integrated electric compressor according to claim 1, wherein the UVW busbar is fixed and installed by the resin case itself being screwed to the circuit board.

5. A method for manufacturing an inverter-integrated electric compressor including
an inverter device integrally incorporated into an inverter housing section that is provided on a housing, the inverter device including a circuit board on which is mounted an inverter circuit, and
a UVW busbar that conducts three-phase alternating current power converted by the inverter circuit on the circuit board to a glass terminal that penetrates the inverter housing section, the method comprising
configuring the UVW busbar with three long thin plate-shaped conductive material busbars, one end of each being provided with a connector terminal that is connected to the glass terminal, by housing the three conductive material busbars in a resin case, and adhering and fixing a section of each of the conductive material busbars in at least one location in the length direction thereof to the resin case side using adhesive, wherein grooves that house the conductive material busbars are formed inside the resin case, and the conductive material busbars that are housed and installed in the grooves are adhered and fixed to the grooves using the adhesive.

* * * * *